US011887508B2

(12) United States Patent
Uchida et al.

(10) Patent No.: US 11,887,508 B2
(45) Date of Patent: Jan. 30, 2024

(54) INFORMATION PROCESSING APPARATUS AND INFORMATION PROCESSING METHOD

(71) Applicant: SONY CORPORATION, Tokyo (JP)

(72) Inventors: Atsushi Uchida, Tokyo (JP); Shinya Maruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 460 days.

(21) Appl. No.: 17/253,032

(22) PCT Filed: May 28, 2019

(86) PCT No.: PCT/JP2019/021072
§ 371 (c)(1),
(2) Date: Dec. 16, 2020

(87) PCT Pub. No.: WO2020/003859
PCT Pub. Date: Jan. 2, 2020

(65) Prior Publication Data
US 2021/0118332 A1    Apr. 22, 2021

(30) Foreign Application Priority Data
Jun. 29, 2018   (JP) ................ 2018-124466

(51) Int. Cl.
G09C 1/00       (2006.01)
G06F 16/903     (2019.01)
(Continued)

(52) U.S. Cl.
CPC ......... G09C 1/00 (2013.01); G06F 16/90344 (2019.01); H04L 9/0643 (2013.01);
(Continued)

(58) Field of Classification Search
None
See application file for complete search history.

(56) References Cited

U.S. PATENT DOCUMENTS

2016/0112190 A1* 4/2016 Aissi ................. H04L 9/08
                                             713/189
2016/0335450 A1* 11/2016 Yoshino ............ G06F 21/6227
2019/0268146 A1*  8/2019 Samid ................ H04L 9/0852

FOREIGN PATENT DOCUMENTS

JP   2006060695 A  *  8/2004
JP   2015-510343 A    4/2015

OTHER PUBLICATIONS

Yoshino, Masayuki et al. "Symmetric Searchable Encryption for Database Applications" [online] IEEE, Aug. 2011 [retrieved Sep. 2, 2023]. Retrieved from the Internet: URL: https://ieeexplore.ieee.org/stamp/stamp.jsp?arnumber=6041990 (Year: 2011).*

(Continued)

Primary Examiner — Linglan Edwards
Assistant Examiner — Joshua Raymond White
(74) Attorney, Agent, or Firm — CHIP LAW GROUP

(57) ABSTRACT

There is provided an information processing apparatus that generates an encrypted bit string in which a hash value calculated by using keyed hashing from a keyword for an information search is mapped into a bit string having a predetermined length, selects a predetermined number of bits from the encrypted bit string on the basis of a dynamically generated random number, inverts the predetermined number of selected bits, and sends the encrypted bit string and inverted-bit-number information to an external apparatus. The inverted-bit-number information indicates a number of bits inverted by a bit inverting unit.

10 Claims, 12 Drawing Sheets

(51) Int. Cl.
*H04L 9/06* (2006.01)
*H04L 9/08* (2006.01)
*H04L 9/32* (2006.01)
*G06F 7/58* (2006.01)

(52) U.S. Cl.
CPC .......... *H04L 9/0869* (2013.01); *H04L 9/3242* (2013.01); *G06F 7/588* (2013.01)

(56) References Cited

OTHER PUBLICATIONS

International Search Report and Written Opinion of PCT Application No. PCT/JP2019/021072, dated Aug. 27, 2019, 06 pages of ISRWO.

Yoshino, et al., "Study of Searchable Encryption Method for DB (2)", Symposium on Cryptography and Information Security, Jan. 25, 2011, 07 pages.

Suga, et al., "Design, Implementation and Evaluation of Symmetric Key Encription with Flexible Keyword Search by using Bloom Filter", IEICE Technical Report, vol. 111, No. 30, 2011, pp. 111-116.

\* cited by examiner

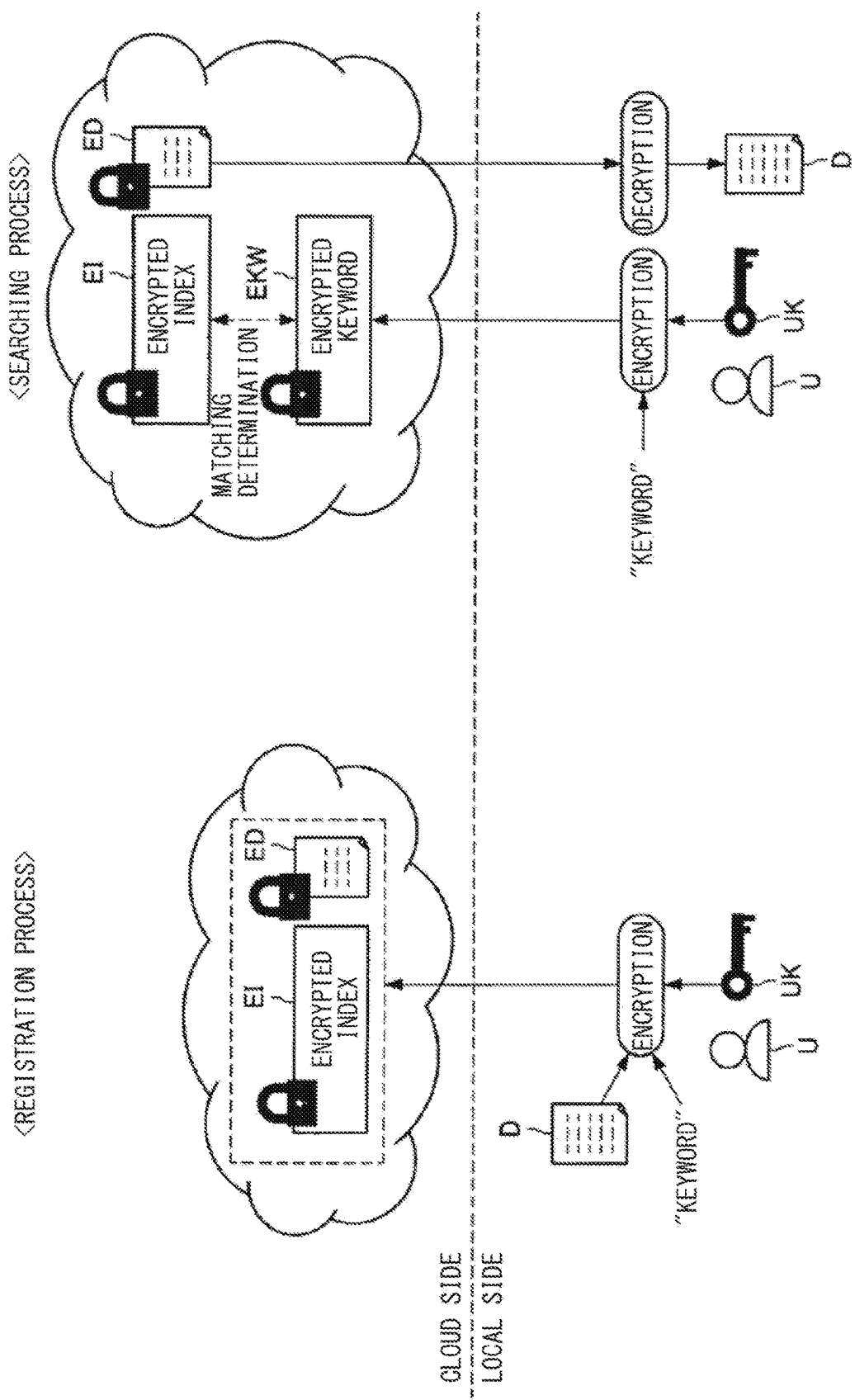
[FIG. 1]

[FIG. 2]
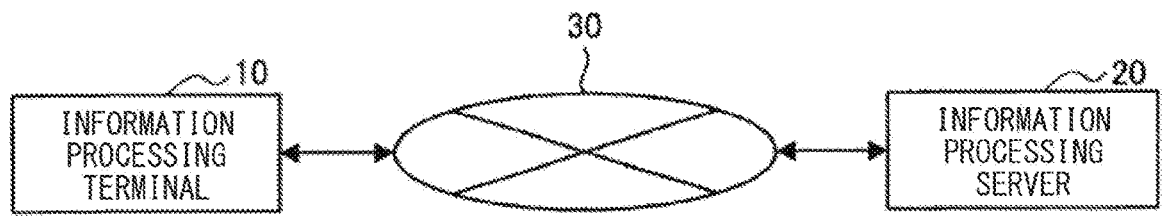

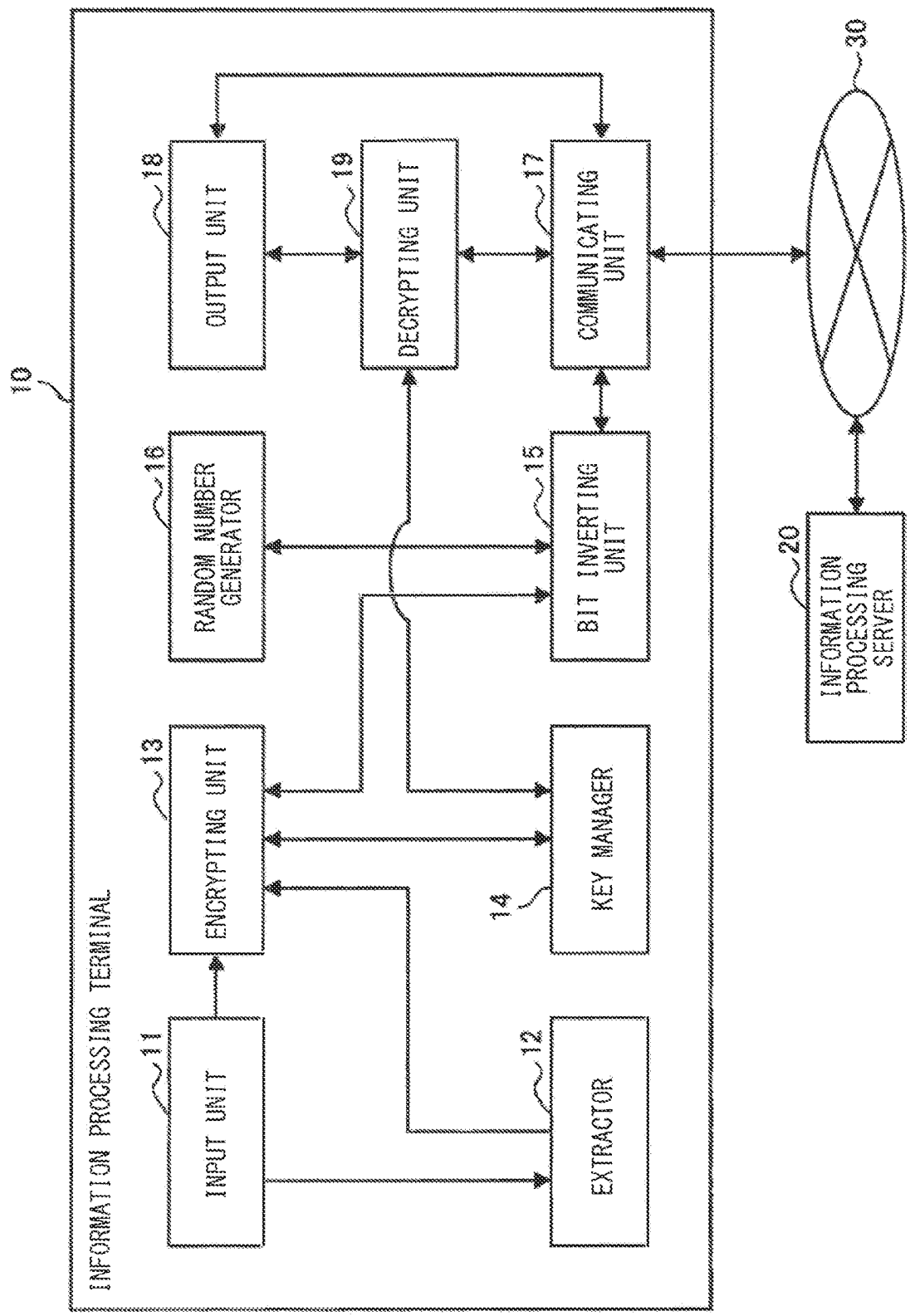
[FIG. 3]

[FIG. 4]
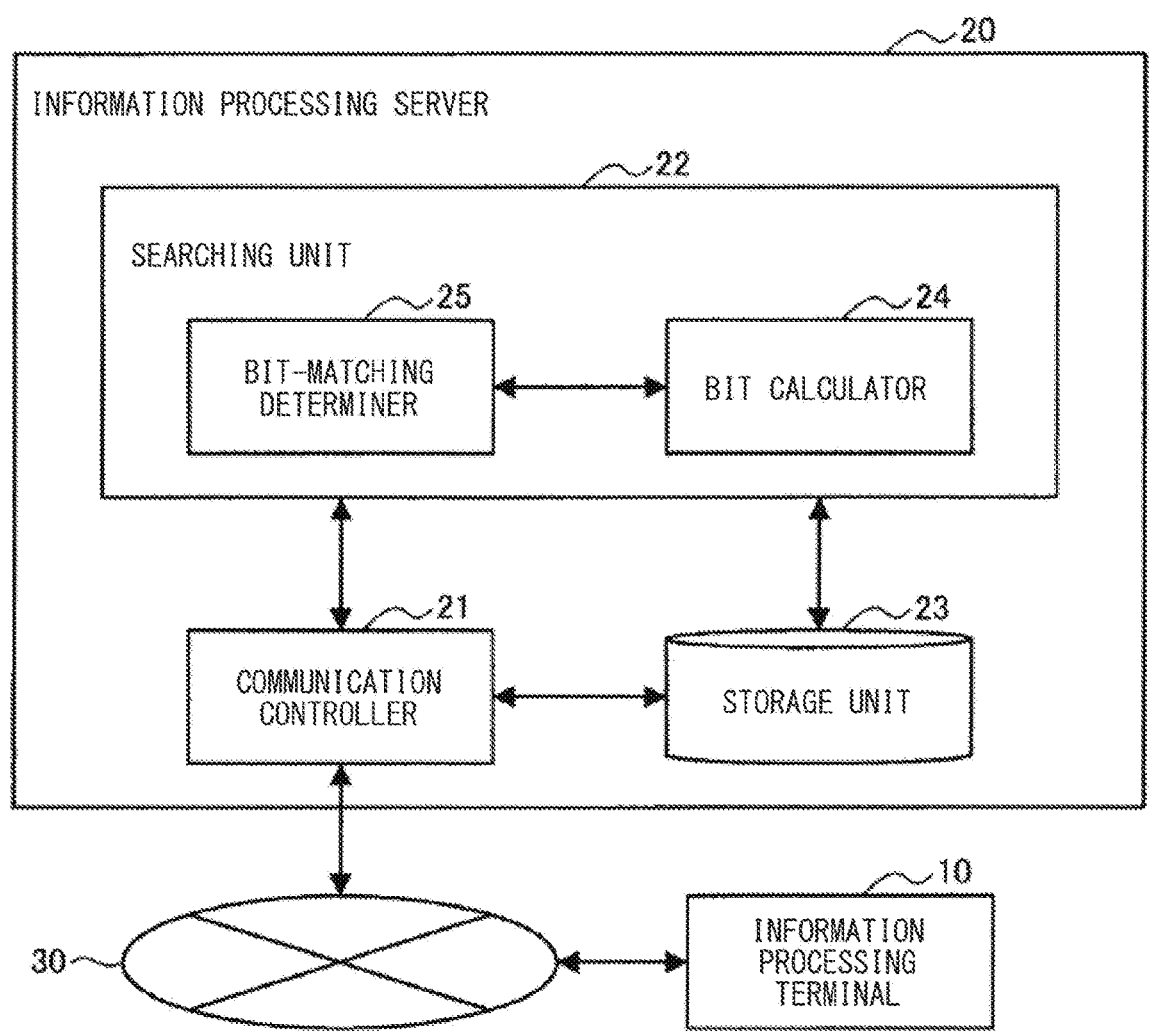

[FIG. 5]
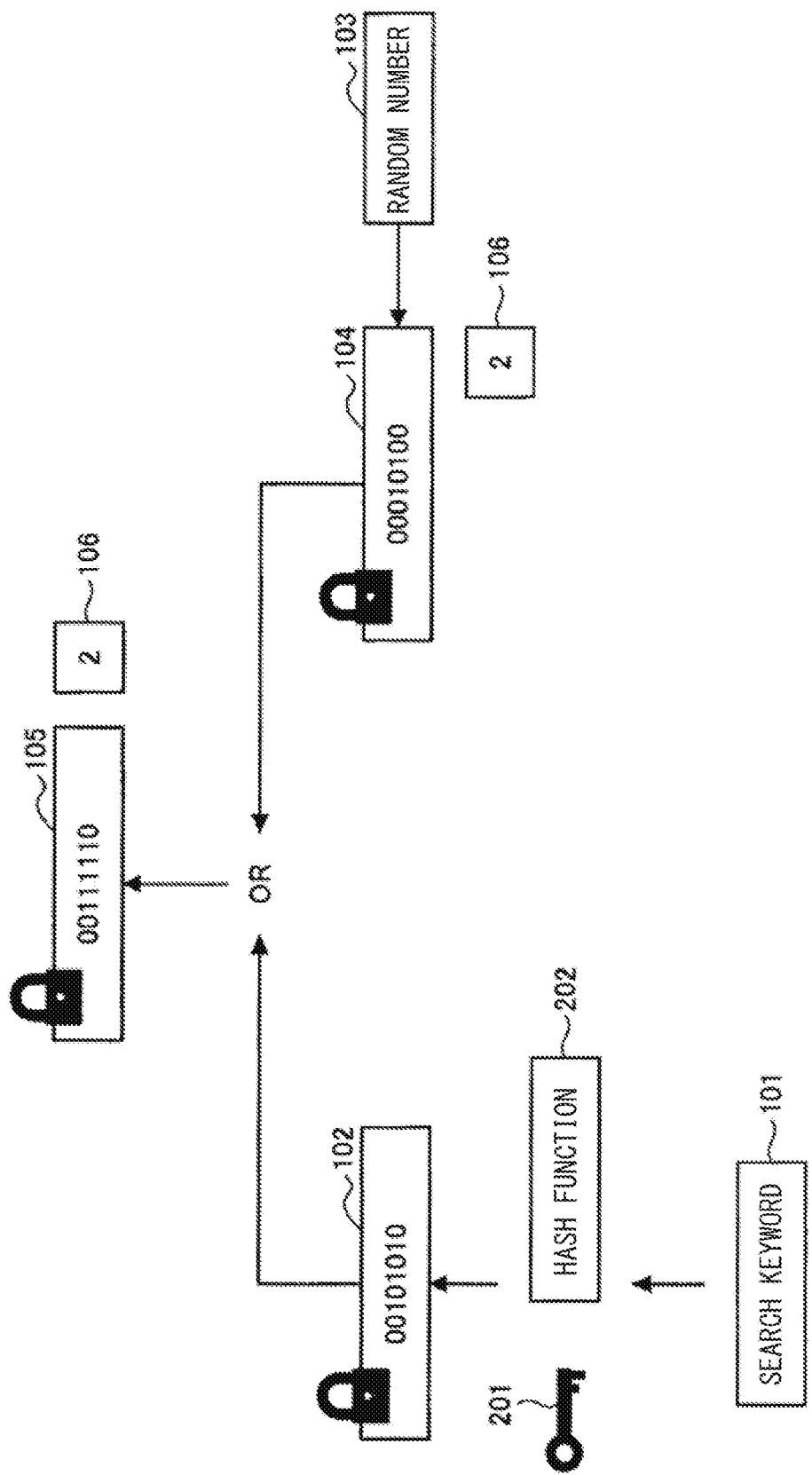

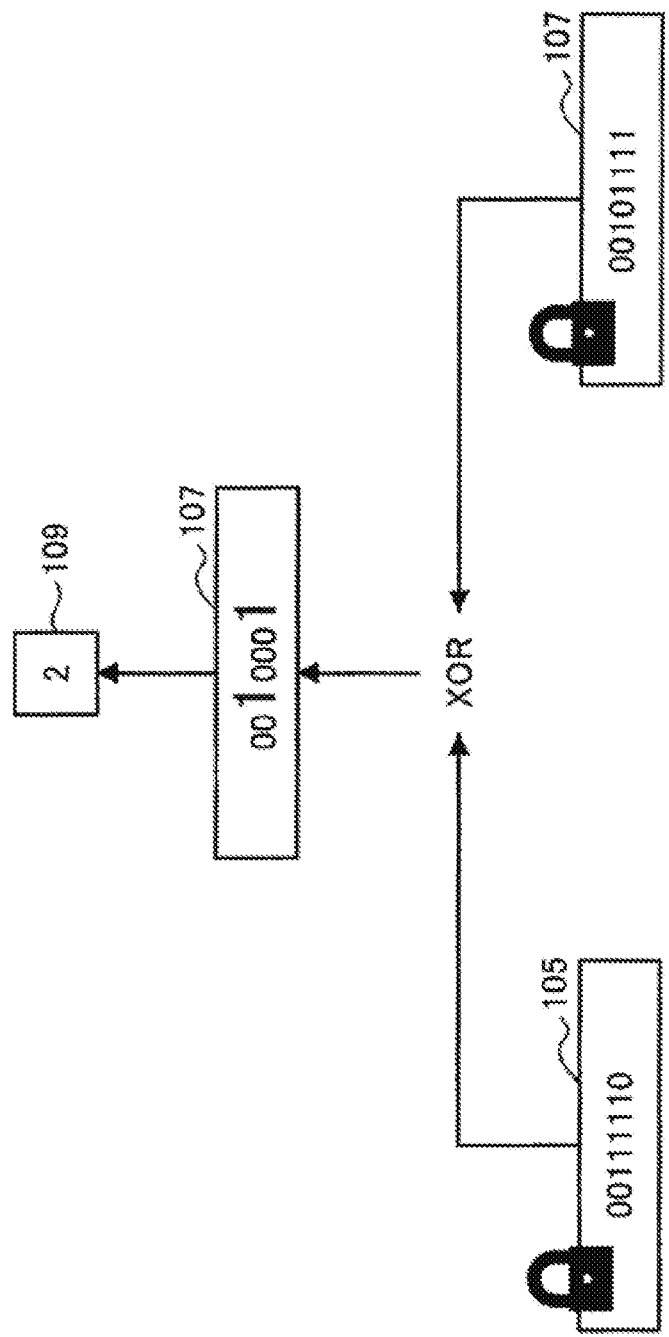
[FIG. 6]

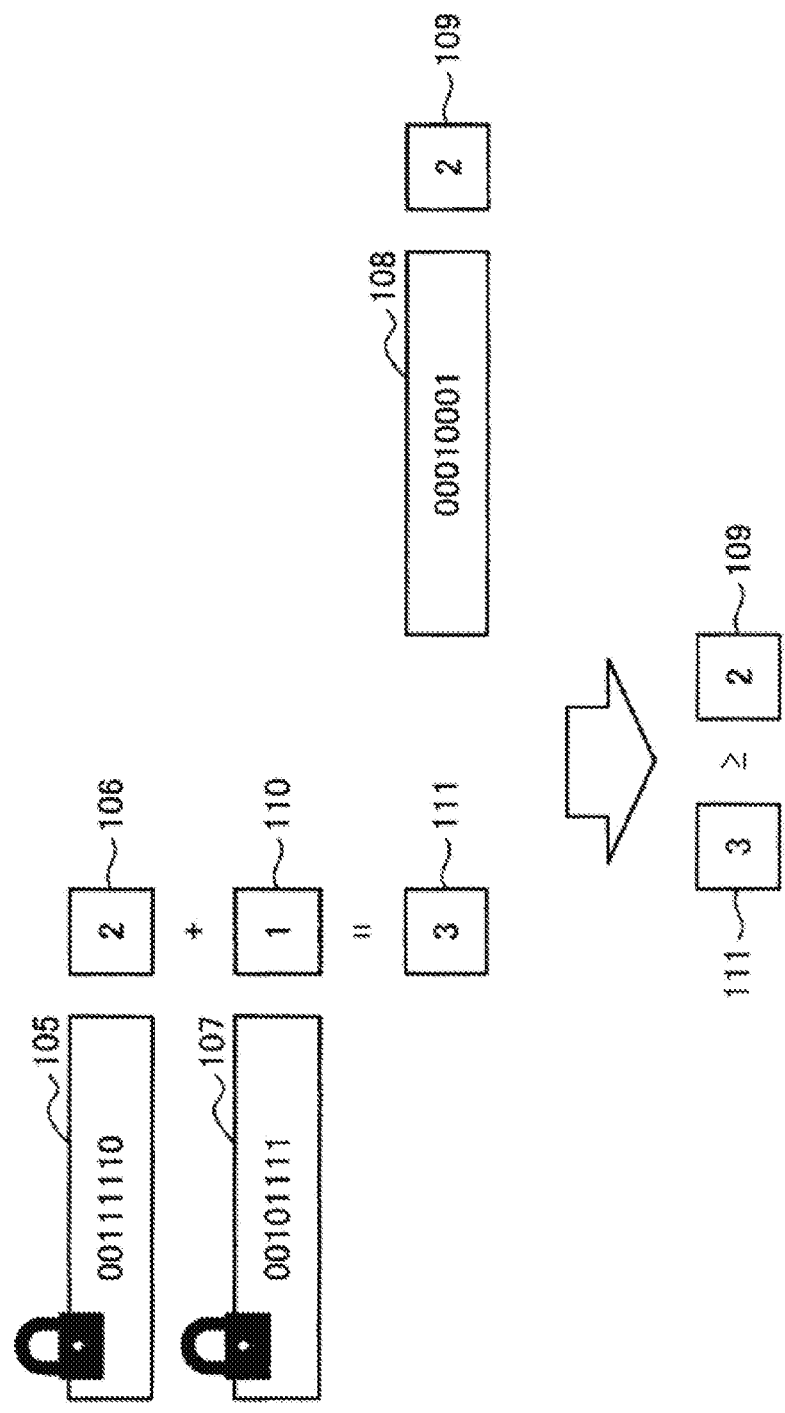
[FIG. 7]

[FIG. 8]
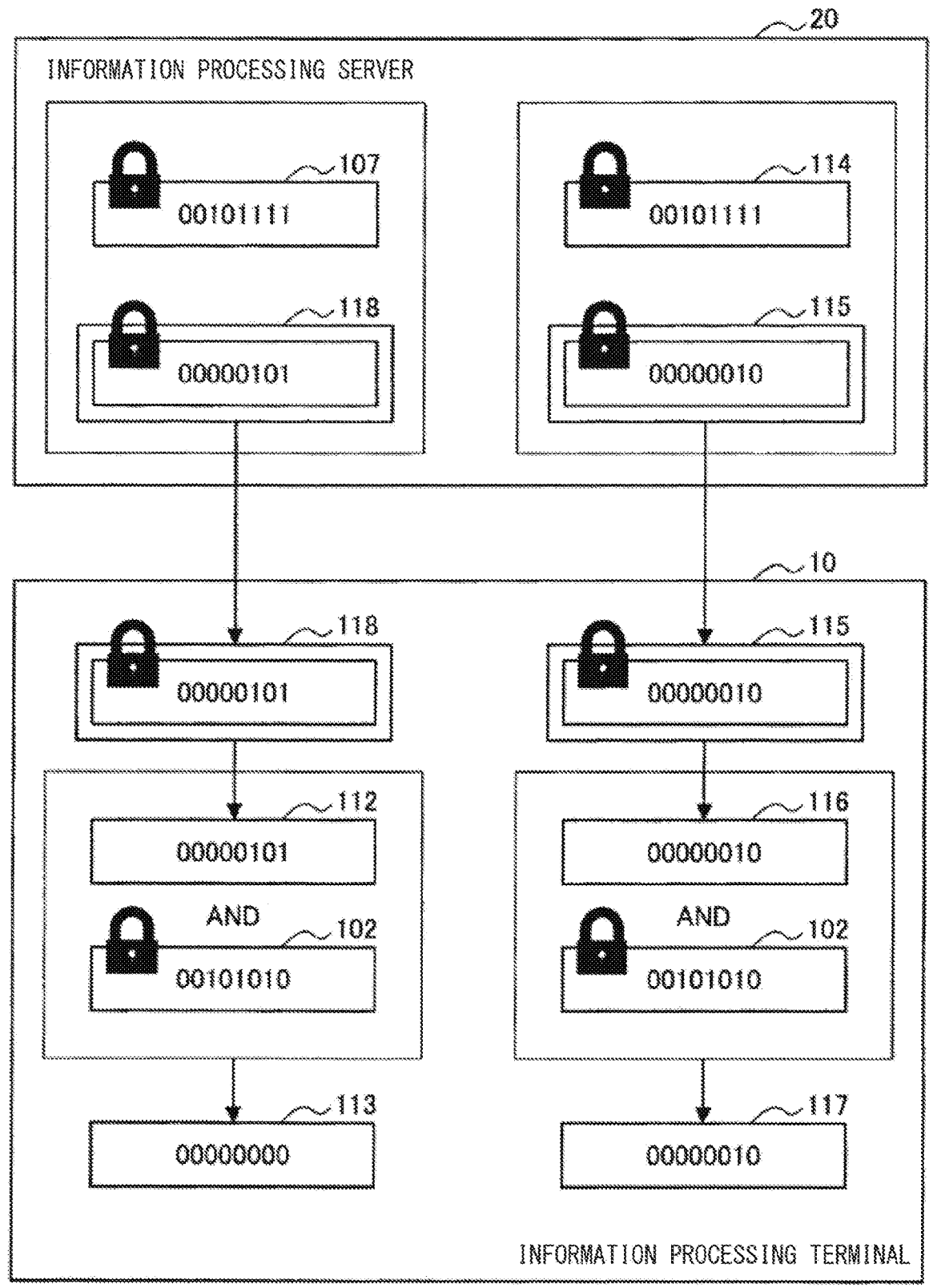

[FIG. 9]
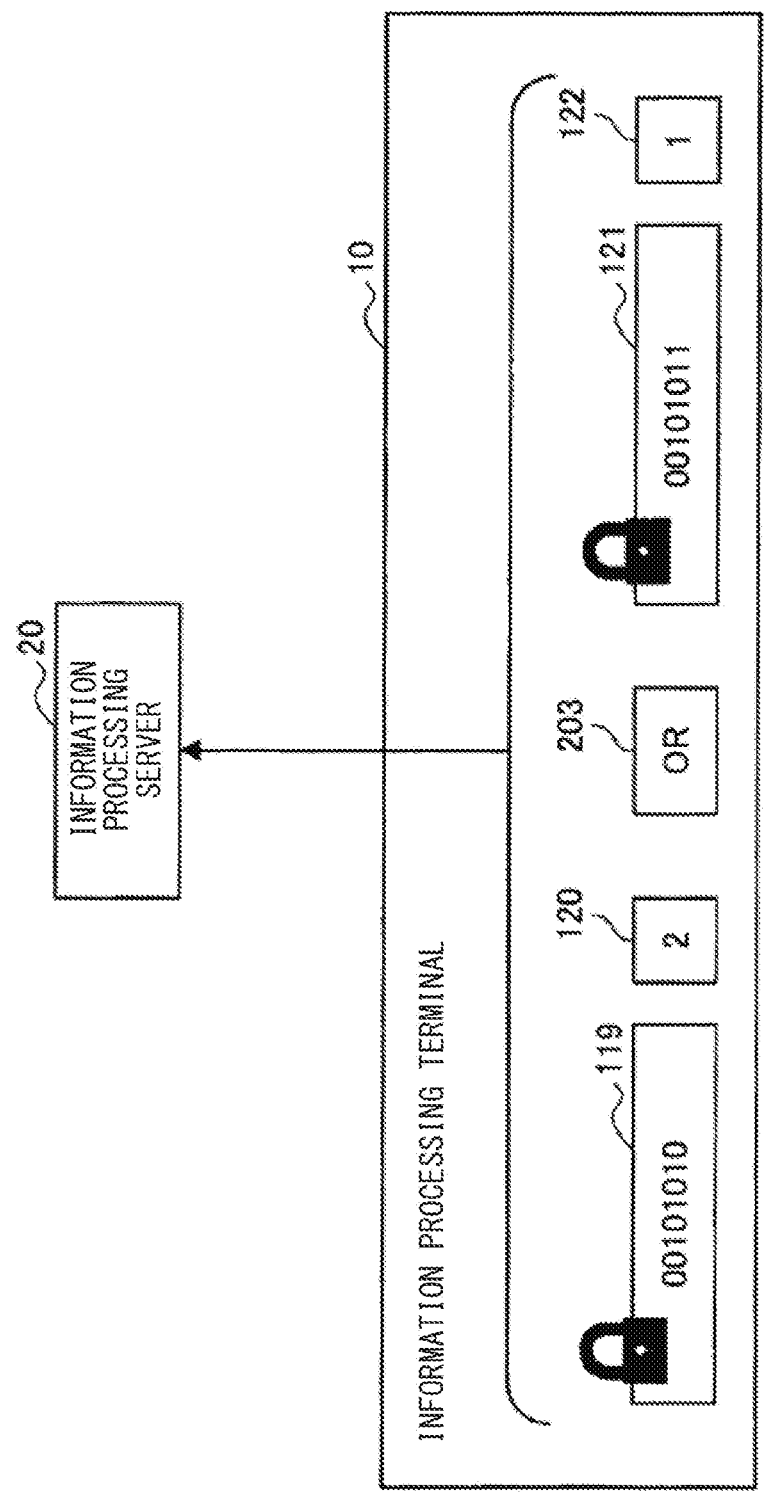

[FIG. 10]
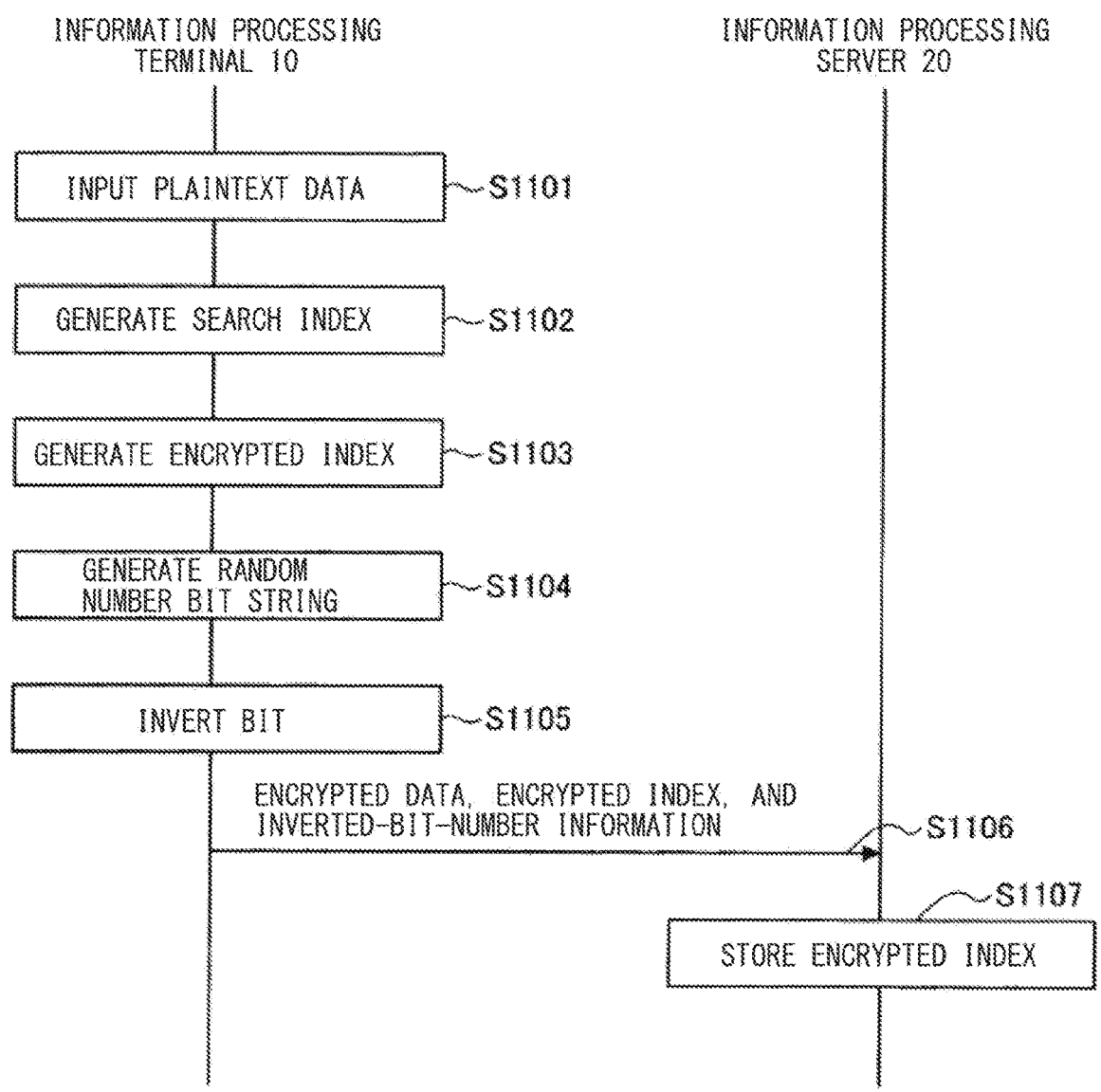

[FIG. 11]
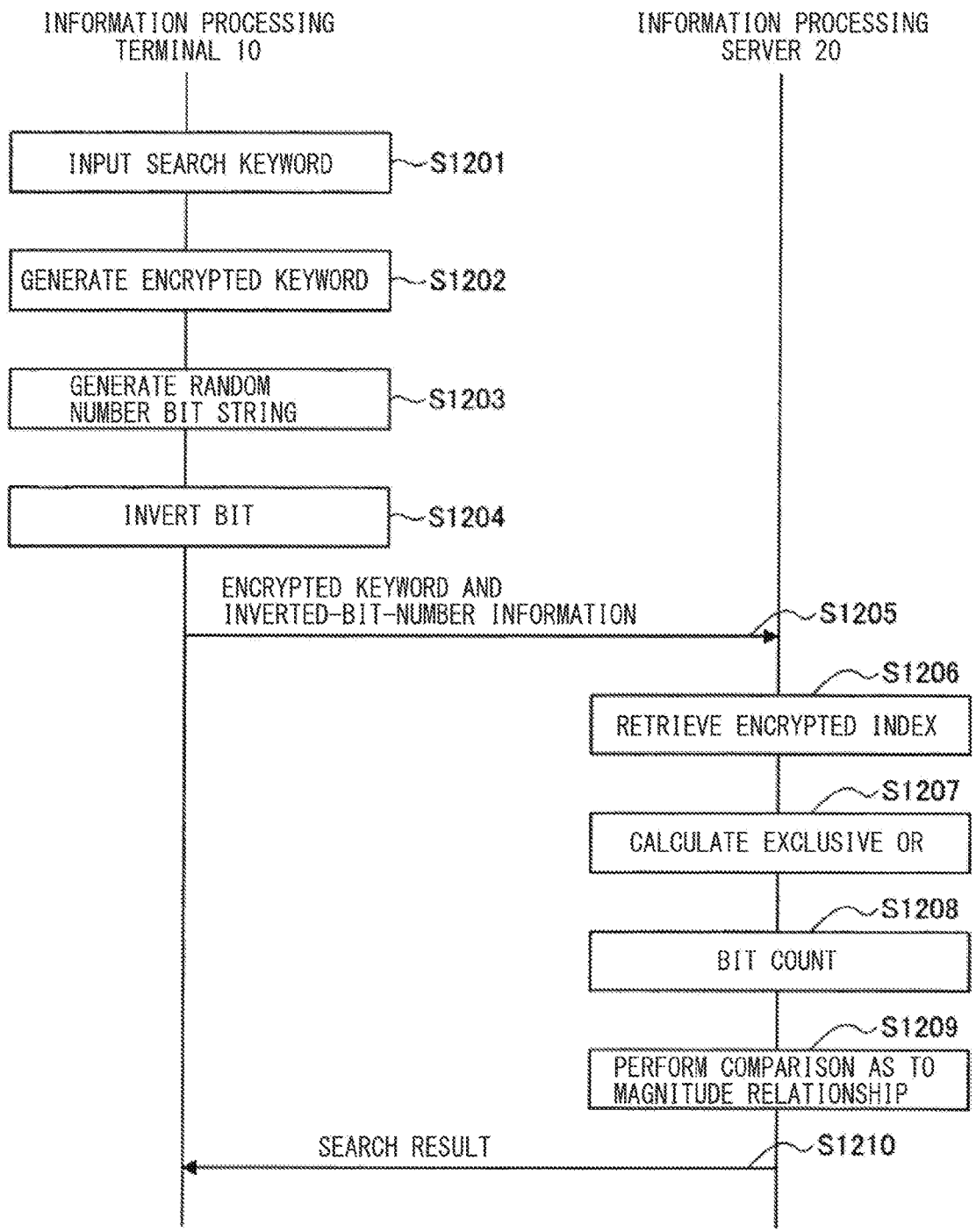

[FIG. 12]
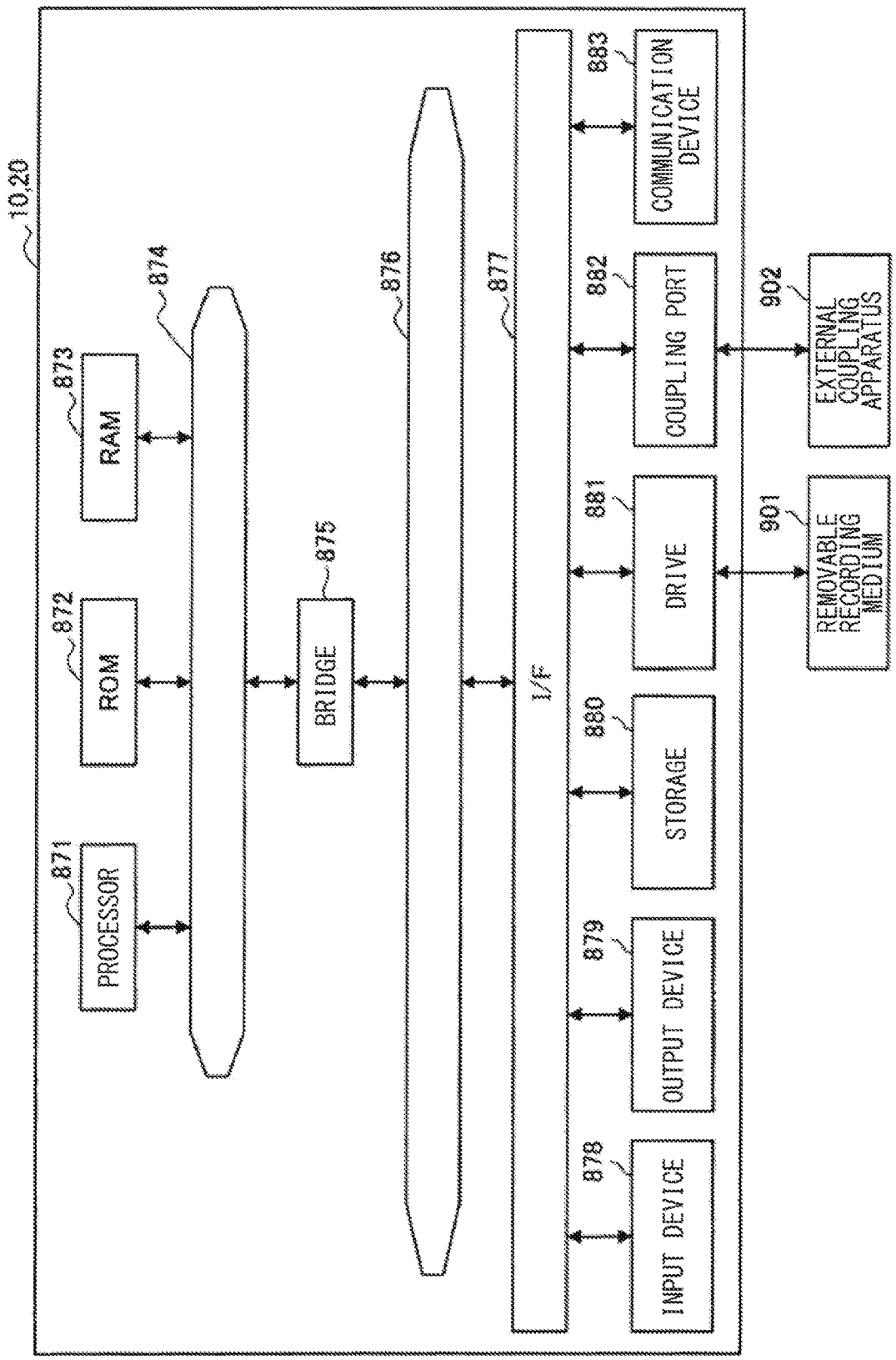

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/021072 filed on May 28, 2019, which claims priority benefit of Japanese Patent Application No. JP 2018-124466 filed in the Japan Patent Office on Jun. 29, 2018. Each of the above-referenced applications is hereby incorporated herein by reference in its entirety.

TECHNICAL FIELD

The present disclosure relates to an information processing apparatus and an information processing method.

BACKGROUND ART

In recent years, cloud services have been gaining widespread use and data have been more frequently stored in external information processing servers. In such information processing servers described above, data are typically encrypted to ensure the level of security, for example. In addition, in recent years, a searchable encryption technology has been developed as one of ways to further increase the level of security. The searchable encryption technology makes it possible to send encrypted data to an external server to perform an information search. For example, PTL 1 discloses a technology that calculates a difference between a measured value with noise added thereto and data to be searched, allowing a search to be executed with the data encrypted.

CITATION LIST

Patent Literature

PTL 1: Japanese Unexamined Patent Application Publication (Published Japanese Translation of PCT Application) No. 2015-510343

SUMMARY OF THE INVENTION

Problems to be Solved by the Invention

However, in a case where the apparatus disclosed in PTL 1 encrypts data having the same contents, the same noise is added. This leads to a possibility that data before encryption are inferred from the frequency of appearance of the encrypted data or the like.

Thus, the present disclosure proposes an information processing apparatus and a method, which enable an information search that ensures both the searching performance and the level of security.

Means for Solving the Problems

According to the present disclosure, there is provided an information processing apparatus including: an encrypting unit; a bit inverting unit; and a communicating unit. The encrypting unit generates an encrypted bit string in which a hash value calculated by using keyed hashing from a keyword for an information search is mapped into a bit string having a predetermined length. The bit inverting unit selects a predetermined number of bits from the encrypted bit string on the basis of a dynamically generated random number, and inverts the predetermined number of selected bits. The communicating unit sends the encrypted bit string and inverted-bit-number information to an external apparatus. The inverted-bit-number information indicates a number of bits inverted by the bit inverting unit.

According to the present disclosure, there is provided an information processing apparatus including: a communication controller; a bit calculator; and a bit-matching determiner. The communication controller receives an encrypted keyword and inverted-bit-number information from a client terminal. The inverted-bit-number information indicates an inverted-bit number of the encrypted keyword. The bit calculator acquires a bit calculation result and a bit count result for the bit calculation result. The bit calculation result is obtained by calculating exclusive OR of the encrypted keyword and an encrypted index to be stored. The bit-matching determiner determines whether or not the encrypted index includes the encrypted keyword on the basis of a comparison as to a magnitude relationship between the bit count result and a sum of the inverted-bit number of the encrypted keyword and an inverted-bit number of the encrypted index. The encrypted keyword and the encrypted index each include an encrypted bit string in which a predetermined number of bits are inverted on the basis of a dynamically generated random number after a hash value calculated by using keyed hashing is mapped into a bit string having a predetermined length. In a case where the bit-matching determiner determines that the encrypted index includes the encrypted keyword, the communication controller sends a search result corresponding to the encrypted keyword to the client terminal.

According to the present disclosure, there is provided an information processing method including, by a processor: generating an encrypted bit string in which a hash value calculated by using keyed hashing from a keyword for an information search is mapped into a bit string having a predetermined length; selecting a predetermined number of bits from the encrypted bit string on the basis of a dynamically generated random number, and inverting the predetermined number of selected bits; and sending inverted-bit-number information regarding a number of inverted bits and the encrypted bit string to an external apparatus.

According to the present disclosure, there is provided an information processing method including, by a processor: receiving an encrypted keyword and inverted-bit-number information indicating an inverted-bit number of the encrypted keyword from a client terminal; acquiring a bit calculation result obtained by calculating exclusive OR of the encrypted keyword and an encrypted index to be stored and a bit count result for the bit calculation result; and determining whether or not the encrypted index includes the encrypted keyword on the basis of a comparison as to a magnitude relationship between the bit count result and a sum of the inverted-bit number of the encrypted keyword and an inverted-bit number of the encrypted index. The encrypted keyword and the encrypted index each include an encrypted bit string in which a predetermined number of bits are inverted on a basis of a dynamically generated random number after a hash value calculated by using keyed hashing is mapped into a bit string having a predetermined length. In a case where the bit-matching determiner determines that the encrypted index includes the encrypted keyword, a search result corresponding to the encrypted keyword is sent to the client terminal.

Effects of the Invention

As described above, according to the present disclosure, it is possible to perform an information search that ensures both the searching performance and the level of security.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is a diagram for describing an outline of a searchable encryption technology.

FIG. 2 is a block diagram illustrating a configuration example of an information processing system according to the present embodiment.

FIG. 3 is a block diagram illustrating a functional configuration example of an information processing terminal 10 according to the embodiment.

FIG. 4 is a block diagram illustrating a functional configuration example of an information processing server 20 according to the embodiment.

FIG. 5 is a diagram for describing generation of an encrypted bit string by the information processing terminal 10 according to the embodiment.

FIG. 6 is a diagram for describing a search process by the information processing server 20 according to the embodiment.

FIG. 7 is a diagram for describing the search process by the information processing server 20 according to the embodiment.

FIG. 8 is a diagram for describing an operation of detecting an erroneous determination in the search process according to the embodiment.

FIG. 9 is a diagram for describing an operation concerning an information search including a plurality of encrypted bit strings according to the embodiment, a plurality of pieces of inverted-bit-number information regarding the number of inverted bits, and a logical condition.

FIG. 10 is a diagram illustrating an example of a flow of an operation of registering an encrypted index according to the embodiment in the information processing server 20.

FIG. 11 is a diagram illustrating an example of a flow of an operation of searching an encrypted index including an encrypted keyword according to the embodiment.

FIG. 12 is a block diagram illustrating a hardware configuration example of each of the information processing terminal 10 and the information processing server 20 according to the embodiment of the present disclosure.

MODES FOR CARRYING OUT THE INVENTION

The following describes a preferred embodiment of the present disclosure in detail with reference to the accompanying drawings. It is to be noted that, in this specification and the accompanying drawings, components that have substantially the same functional configuration are indicated by the same reference signs and redundant description thereof is thus omitted.

It is to be noted that description is given in the following order.
1. Outline
2. System Configuration Example
3. Functional Configuration Example of Information Processing Terminal 10
4. Functional Configuration Example of Information Processing Server 20
5. Operation Example
6. Flow of Operation
7. Hardware Configuration Example
8. Conclusion

1. Outline

First, the outline of an embodiment of the present disclosure is described. In recent years, cloud services have been gaining widespread use and data have been more frequently stored in external information processing servers. This causes important data to be used through the Internet, which causes a concern about the use of cloud services in terms of data leakage or the like. As countermeasures, the use of encryption communication allows a certain level of security to be ensured. However, in a case where an information search is performed from a locally installed client terminal to a server installed in the cloud, it is necessary to perform a decryption process at least once. In recent years, a searchable encryption technology has been, however, developed. The searchable encryption technology allows a search to be executed with search data and a search keyword encrypted.

Here, the searchable encryption technology is described. FIG. 1 is a diagram for describing the outline of the searchable encryption technology. The left portion of FIG. 1 illustrates a state of a process of registering data to be searched. In the left portion of FIG. 1, a user U first uses a locally installed client terminal to encrypt plaintext data D and a keyword list extracted from the plaintext data by using a user key UK. Next, the user U sends encrypted data ED obtained by encrypting the plaintext data D and an encrypted index EI obtained by encrypting the keyword list to a server disposed on a cloud side.

Furthermore, the right portion of FIG. 1 illustrates a state of a search process. The user U encrypts a search keyword by using the user key UK on a local side to send an encrypted keyword EKW to the cloud side. The cloud side compares the received encrypted keyword EKW with the held encrypted index EI to determine whether or not the held encrypted index EI includes the encrypted keyword EKW. In a case where the encrypted index EI exists including the encrypted keyword EKW, the encrypted data ED corresponding to the encrypted index EI are sent to the local side. At the end, the encrypted data ED are decrypted on the local side, allowing the user U to obtain the plaintext data D serving as a search target.

In this way, the searchable encryption technology described above enables the user U to acquire the encrypted data ED by using the encrypted keyword EKW without decrypting the encrypted data ED stored on the cloud side. However, in a case of the searchable encryption technology described above, the same encrypted index is always generated from a search index having the same keyword. This leads to a possibility that the search index before encryption is inferred on the basis of the degree of frequency of appearance of the encrypted index. In contrast, encryption executed by using probabilistic encryption makes it possible to generate a different encrypted text for each time. Meanwhile, the searching performance, however, decreases.

The technical idea according to the embodiment of the present disclosure has been made with the points described above in focus, and enables an information search that ensures both the searching performance and the level of security. Thus, one of the features of the information processing apparatus according to the embodiment of the present disclosure includes generating an encrypted bit string in which a hash value calculated by using keyed hashing from a keyword for an information search is mapped into a predetermined bit string. In addition, one of the features of the information processing apparatus according to the present embodiment includes selecting a predetermined number of bits from the encrypted bit string on the basis of a dynamically generated random number and inverting the predetermined number of selected bits. Furthermore, one of the features of the information processing apparatus according to the present embodiment includes sending inverted-bit-number information and the encrypted bit string to an external apparatus. The inverted-bit-number information relates to the number of bits inverted by a bit inverting unit.

Here, the "keyword for an information search" is, for example, a search keyword or a search index. In addition, the "search index" here is an index for a search for the details of plaintext data. Furthermore, the "inverted-bit-number information" is information regarding an inverted-bit number indicating the number of bits having the values inverted after encryption among the bits included in the bits of an encrypted bit string.

Furthermore, one of the features of the information processing apparatus according to the embodiment of the present disclosure includes receiving an encrypted keyword and inverted-bit-number information indicating the inverted-bit number of the encrypted keyword from a client terminal. In addition, one of the features of the information processing apparatus according to the embodiment of the present disclosure includes acquiring a bit calculation result and a bit count result for the bit calculation result. The bit calculation result is obtained by calculating exclusive OR of an encrypted keyword and an encrypted index to be stored. One of the features includes determining whether or not an encrypted index includes an encrypted keyword on the basis of a comparison as to a magnitude relationship between a bit count result and the sum of the inverted-bit number of the encrypted keyword and the inverted-bit number of the encrypted index. Here, the "bit count" means counting the number of 1-value bits included in a bit string.

The features of an information processing terminal 10 and an information processing server 20 make it possible, for example, to perform an information search with less possibility of information leakage while keeping sufficient searching speed.

2. System Configuration Example

Next, a configuration example of an information processing system according to the embodiment of the present disclosure is described. FIG. 2 is a block diagram illustrating a configuration example of the information processing system according to the present embodiment. The information processing system includes the information processing terminal 10 and the information processing server 20. In addition, the respective components described above are coupled through a network 30 to allow for information communication with each other.

It is to be noted that the present disclosure sometimes refers to the information processing terminal 10 as a client. In addition, the present disclosure sometimes refers to a process by the information processing terminal 10 as a process on a local side. In addition, the present disclosure sometimes refers to the information processing server 20 simply as a server. In addition, the present disclosure sometimes refers to a process by the information processing server 20 as a process on a cloud side.

(Information Processing Terminal 10)

The information processing terminal 10 according to the present embodiment is an information processing apparatus for registering encrypted data and performing an information search using searchable encryption on the basis of an input operation performed by a user. In addition, the information processing terminal 10 according to the present embodiment is an information processing apparatus that generates an encrypted bit string in which a hash value calculated by using keyed hashing from a keyword for an information search is mapped into a predetermined bit string.

The information processing terminal 10 enables a user to perform an information search that ensures both the searching performance and the level of security. The information processing terminal 10 according to the present embodiment may be, for example, a mobile phone, a smartphone, a tablet terminal, a wearable apparatus, PC (Personal Computer), or the like. The information processing terminal 10 according to the present embodiment is not, however, limited to the examples, but may include various apparatuses that are each able to execute the processes described above.

(Information Processing Sever 20)

The information processing server 20 according to the present embodiment is an information processing apparatus that stores encrypted data sent from the information processing terminal 10.

Furthermore, the information processing server 20 according to the present embodiment is an information processing apparatus that sends, to the information processing terminal 10, a search result corresponding to an encrypted keyword sent from the information processing terminal 10. In addition, the "search result" here includes, for example, encrypted data and a list for encrypted data.

(Network 30)

The network 30 has a function of coupling the information processing terminal 10 and the information processing server 20. The network 30 may include a public network such as the Internet, a telephone network, and a satellite communication network, various kinds of LANs (Local Area Networks) including Ethernet (registered trademark), WAN (Wide Area Network), and the like. In addition, the network 30 may also include a dedicated line network such as IP-VPN (Internet Protocol-Virtual Private Network). In addition, the network 30 may also include a wireless communication network such as Wi-Fi (registered trademark) or Bluetooth (registered trademark).

The above has described the configuration example of the information processing system according to the present embodiment. It is to be noted that the system configuration described with reference to FIG. 2 is merely an example. It is possible to flexibly modify the configuration of the information processing system according to the present embodiment depending on specifications or operations.

3. Functional Configuration Example of Information Processing Terminal 10

Next, a functional configuration example of the information processing terminal 10 according to the present embodiment is described. FIG. 3 is a block diagram illustrating a functional configuration example of the information processing terminal 10 according to the present embodiment. With reference to FIG. 3, the information processing terminal 10 according to the present embodiment includes an input unit 11, an extractor 12, an encrypting unit 13, a key manager 14, a bit inverting unit 15, a random number generator 16, a communicating unit 17, an output unit 18, and a decrypting unit 19.

(Input Unit 11)

The input unit 11 according to the present embodiment has functions of accepting an input operation performed by a user, and outputting plaintext data or a search keyword to the extractor 12 or the encrypting unit 13 described below.

(Extractor 12)

The extractor 12 according to the present embodiment has a function of extracting a word or a combination of words from the plaintext data accepted by the input unit 11 from the user to generate a search index. The extractor 12 may extract a predetermined keyword from the data by using morphological analysis or n-gram to generate a search index.

(Encrypting Unit 13)

The encrypting unit 13 according to the present embodiment has a function of generating an encrypted bit string by using a hash scheme in which a hash value obtained by calculating plaintext data or search keyword inputted from the input unit 11 and a keyword list extracted by the extractor 12 with keyed hashing is mapped into a bit string having a predetermined length. It is to be noted that the hash scheme uses a bit string having a fixed length that does not depend on the number of search keywords. This provides an advantage in which various processes are performed at high speed as compared with public-key encryption or common-key encryption. In addition, here, as for the encrypted bit string, the encrypting unit 13 according to the present embodiment may employ a Bloom filter, a counting filter, or the like that performs encoding into a form of AMQ (Appriximate Membership Query).

Furthermore, the plaintext data may be encrypted to generate encrypted data. In addition, the encrypting unit 13 may generate an encrypted bit string by using HMAC algorithm. Moreover, a grouped encrypted bit string may be generated by calculating logical OR of a plurality of encrypted bit strings, and the grouped encrypted bit string may be regarded as an encrypted index or an encrypted keyword.

(Key Manager 14)

The key manager 14 according to the present embodiment has a function of managing a key used to encrypt plaintext data, a search index, and a search keyword. The key manager 14 sends the key to the encrypting unit 13 on the basis of a request made by the encrypting unit 13. It is to be noted that the key sent to the encrypting unit 13 is substituted into a hash function by the encrypting unit 13. In addition, the key manager 14 according to the present embodiment has a function of managing a key used for the decrypting unit 19 to decrypt encrypted data, an encrypted index, and an encrypted keyword.

(Bit Inverting Unit 15)

The bit inverting unit 15 according to the present embodiment has functions of selecting a predetermined number of bits from the encrypted bit string on the basis of a dynamically generated random number and inverting the predetermined number of selected bits. The above-described function of the bit inverting unit 15 according to the present embodiment makes it possible to set a different bit string for each time as the encrypted bit string sent and received between the information processing terminal 10 and the information processing server 20. In this encrypted bit string, a predetermined number of bits are inverted.

In addition, the bit inverting unit 15 may select a predetermined number of 0-value bits from the encrypted bit string on the basis of the dynamically generated random number and invert the predetermined number of selected 0-value bits to 1-value bits.

(Random Number Generator 16)

The random number generator 16 according to the present embodiment has a function of generating a random number. The random number generator 16 according to the present embodiment has a function of sending the generated random number to the bit inverting unit 15. It is to be noted that the random number generated by the random number generator 16 is used for a process of inverting a bit of an encrypted bit string by the bit inverting unit 15.

(Communicating Unit 17)

The communicating unit 17 according to the present embodiment has a function of sending the encrypted bit string and inverted-bit-number information to an external apparatus such as the information processing server 20. The inverted-bit-number information indicates the number of bits inverted by the bit inverting unit 15. In addition, the communicating unit 17 according to the present embodiment may send, to the information processing server 20, the encrypted keyword and the inverted-bit-number information regarding the number of bits inverted by the bit inverting unit 15, and may receive an encryption search result for the sent encrypted keyword. Here, the encryption search result is a result of an information search executed by using a technology relating to searchable encryption. In addition, here, the search result for an encrypted keyword includes, for example, an encrypted index including the encrypted keyword or encrypted data corresponding to the encrypted index.

Furthermore, the communicating unit 17 according to the present embodiment may further send a plurality of encrypted bit strings, a plurality of pieces of inverted-bit-number information regarding the number of bits inverted by the bit inverting unit, and a logical condition. Here, the logical condition is, for example, a logical OR condition or a logical AND condition. In addition, the communicating unit 17 according to the present embodiment may receive an encrypted index corresponding to the sent encrypted keyword and inverted-bit-number information corresponding to the encrypted index. In the encrypted index, a predetermined number of bits are inverted.

(Output Unit 18)

The output unit 18 according to the present embodiment has a function of outputting, to a user, the encryption search result received by the communicating unit 17 from the information processing server 20. The output unit 18 according to the present embodiment includes a display device or the like that presents visual information. Examples of the display device described above include a liquid crystal display (LCD: Liquid Crystal Display) device, an OLED (Organic Light Emitting Diode) display device, and the like.

(Decrypting Unit 19)

The decrypting unit 19 according to the present embodiment has a function of decrypting encrypted information. In addition, the decrypting unit 19 according to the present embodiment may generate an encrypted index before bits are inverted by using the encrypted index received from the information processing server 20 and the inverted-bit-number information corresponding to the encrypted index. The decrypting unit 19 may send the decrypted information to the output unit 18. It is to be noted that the information to be decrypted includes encrypted data, an encrypted index, an encrypted keyword, encrypted inverted-bit-number information, and the like.

The above has described the functional configuration example of the information processing terminal 10 according to the present embodiment. It is to be noted that the configuration described above with reference to FIG. 3 is merely an example. The functional configuration of the information processing terminal 10 according to the present embodiment is not limited to that of the example. It is possible to flexibly modify the functional configuration of the information processing terminal 10 according to the present embodiment in accordance with the specifications and operations.

4. Functional Configuration Example of Information Processing Server 20

Next, a functional configuration example of the information processing server 20 according to the present embodiment is described. FIG. 4 is a block diagram illustrating a functional configuration example of the information processing server 20 according to the present embodiment. With reference to FIG. 4, the information processing server 20 according to the present embodiment includes a communication controller 21, a searching unit 22, a storage unit 23, a bit calculator 24, and a bit-matching determiner 25.

(Communication Controller 21)

The communication controller 21 according to the present embodiment has a function of receiving, from the information processing terminal 10, an encrypted keyword and inverted-bit-number information indicating the inverted-bit number of the encrypted keyword.

Furthermore, in a case where the bit-matching determiner 25 determines that an encrypted index includes the encrypted keyword, the communication controller 21 according to the present embodiment may send a search result corresponding to the encrypted keyword to the information processing terminal 10.

(Searching Unit 22)

The searching unit 22 according to the present embodiment includes the bit calculator 24 and the bit-matching determiner 25 described below, and has a function of determining whether or not the encrypted index includes the encrypted keyword received through the communication controller 21. In addition, the searching unit 22 according to the present embodiment has a function of retrieving the encrypted index from the storage unit 23.

(Storage Unit 23)

The storage unit 23 according to the present embodiment includes a storage region for temporarily or permanently storing various kinds of information. For example, various kinds of information concerning an information search may be stored in the storage unit 23. As a specific example, encrypted data, an encrypted index, or inverted-bit-number information regarding the number of bits inverted by the bit inverting unit 15 is stored in the storage unit 23 according to the present embodiment. Needless to say, those described above are merely examples. The type of information stored in the storage unit 23 is not particularly limited.

(Bit Calculator 24)

The bit calculator 24 according to the embodiment of the present disclosure has a function of acquiring a bit calculation result and a bit count result for the bit calculation result. The bit calculation result is obtained by calculating exclusive OR of an encrypted keyword and an encrypted index to be stored. In addition, for each of a plurality of encrypted keywords, the bit calculator 24 according to the present embodiment may calculate exclusive OR of the encrypted keyword and an encrypted index to acquire a bit calculation result, and perform bit count to acquire a bit count result. Here, the "bit count" means counting the number of 1-value bits in a target bit string.

(Bit-Matching Determiner 25)

The bit-matching determiner 25 according to the present embodiment has a function of determining whether or not an encrypted index includes an encrypted keyword on the basis of a comparison as to a magnitude relationship between a bit count result and the sum of the inverted-bit number of the encrypted keyword and the inverted-bit number of the encrypted index. In a case where the bit calculation result is less than or equal to the sum of the numbers of inverted bits of both the encrypted keyword and the encrypted index, the bit-matching determiner 25 according to the present embodiment may determine that a search index includes a search keyword.

The above has described the functional configuration example of the information processing server 20 according to the present embodiment. It is to be noted that the configuration described above with reference to FIG. 3 is merely an example. The functional configuration of the information processing terminal 10 according to the present embodiment is not limited to that of the example. It is possible to flexibly modify the functional configuration of the information processing server 20 according to the present embodiment in accordance with the specifications and operations.

5. Operation Example

Next, description is made of a flow of an operation of an information search by using the information processing terminal 10 and the information processing server 20 according to the present embodiment. FIG. 5 is a diagram for describing the generation of an encrypted bit string by the information processing terminal 10 according to the present embodiment. FIG. 5 illustrates a flow in which an encrypted bit string is generated from a keyword for an information search by using a keyed hash function, and a predetermined number of bits in the encrypted bit string are inverted on the basis of a dynamically generated random number.

Here, the "encrypted bit string" is an encrypted keyword obtained by encrypting a search keyword, or an encrypted index obtained by encrypting a search index. Flows of operations of encrypting a search keyword or a search index and inverting a predetermined number of bits by the information processing terminal 10 are the same, and are thus described in a collective manner.

In FIG. 5, the bit inverting unit 15 according to the present embodiment first uses a user key 201 and a hash function 202 to generate an encrypted bit string 102 from a keyword 101 for an information search. Here, the encrypting unit 13 may generate the encrypted bit string 102 by using HMAC algorithm.

More specifically, the encrypting unit 13 according to the present embodiment first uses the user key 201 and 202 hash functions to compute a hash value from the keyword 101 for an information search. In the example illustrated in FIG. 5, the keyword 101 for an information search is a search keyword. However, the keyword 101 for an information search may be a search index. The encrypting unit 13 maps the calculated hash value into a bit string having a predetermined length to generate the encrypted bit string 102 having a value of "00101010".

Meanwhile, the random number generator 16 dynamically generates a random number 103. Next, the bit inverting unit 15 uses the random number 103 generated by the random number generator 16 to generate a random number bit string 104 having the same length as that of the encrypted bit string 102. In a case of the example illustrated in FIG. 5, the bit inverting unit 15 generates the random number bit string 104 having a value of "00010100". In addition, the bit inverting unit 15 performs bit count for the random number bit string 104 to generate a bit count result 106 having a value of "2".

Furthermore, the bit inverting unit 15 according to the present embodiment calculates logical OR of the encrypted bit string 102 and the random number bit string 104 to generate an encrypted bit string 105 in which a predetermined number of bits are inverted. The encrypted bit string 105 has a value of "00111110".

In a case where the keyword 101 for an information search is a search index in FIG. 5, the encrypted index that is the encrypted bit string 105 is sent to the information processing server 20 after the process described above and the encrypted index is stored in the storage unit 23. It is to be noted that the following describes a flow of an operation in a case where the encrypted bit string 105 generated as described above is an encrypted keyword and the information processing server 20 uses the encrypted keyword to perform a search process.

Each of FIGS. 6 and 7 is a diagram for describing the search process by the information processing server 20 according to the present embodiment. FIG. 6 illustrates a flow in which exclusive OR of an encrypted keyword and an encrypted index is calculated, and the number of inverted bits is acquired from a result of the calculation.

Specific description is made. In the example illustrated in FIG. 6, the bit calculator 24 according to the present embodiment first calculates exclusive OR of the encrypted keyword 105 received from the information processing terminal 10 and having a value of "00111110" and an encrypted index 107 received from the information processing terminal 10 and having a value of "00101111", and acquires a bit calculation result 108 having a value of "00010001". Next, the bit calculator 24 according to the present embodiment performs bit count on the bit calculation result 108 to generate a bit count result 109 indicating the number "2" of 1-value bits.

FIG. 7 is a diagram illustrating a flow of determining whether or not an encrypted index includes an encrypted keyword. In FIG. 7, the bit-matching determiner 25 according to the present embodiment calculates an inversion sum 111 having a value of "3" that is the sum of the inverted-bit number 106 of the encrypted keyword 105 through inversion and an inverted-bit number 110 of the encrypted index 107 through inversion. Next, the bit-matching determiner 25 according to the present embodiment determines a magnitude relationship between the inversion sum 111 and the bit count result 109 calculated by the bit calculator 24 for the bit calculation result 108.

Here, in a case where the bit count result 109 is less than or equal to the inversion sum 111, the bit-matching determiner 25 may determine that the encrypted index 107 includes the encrypted keyword 105. A reason for the determination is described below. In a case where the encrypted index 107 includes the encrypted keyword 105, the calculation of exclusive OR allows cancelling out of a portion of the encrypted bit string before bits are inverted. Thus, only a random number bit string of the encrypted keyword 105 and the encrypted index 107 is left at the end as a result of the calculation of the exclusive OR. In other words, in a case where the encrypted index 107 includes the encrypted keyword 105, the bit count result 109 has a value less than or equal to the inversion sum 111.

The example illustrated in FIG. 7 illustrates the inverted-bit number 106 of the encrypted keyword 105 that has a value of "2" and the inverted-bit number 110 of the encrypted index 107 through inversion that has a value "1". The bit-matching determiner 25 according to the present embodiment calculates the inversion sum 111 having a value of "3" that is a sum of the inverted-bit number 106 having a value of "3" and the inverted-bit number 110. Next, the bit-matching determiner 25 according to the present embodiment determines a magnitude relationship between the inversion sum 111 having a value of "3" and the bit count result 109 having a value of "2".

Next, since the bit count result 109 is less than or equal to the inversion sum 111 as a result of the determination of the magnitude relationship, the bit-matching determiner 25 according to the present embodiment determines that the encrypted index 107 includes the encrypted keyword 105. In other words, the bit-matching determiner 25 according to the present embodiment determines that a search index corresponding to the encrypted index 107 includes a search keyword corresponding to the encrypted bit string 105.

In this way, one of the features of the information processing terminal 10 and the information processing server 20 according to the present embodiment includes executing an information search with a random number bit string added to an encrypted keyword and an encrypted index. With the feature, no probabilistic encryption is used. In addition, the original encrypted keyword is not identified unless the random number bit string is found. Thus, it is possible to perform an information search that ensures both the searching performance and the level of security.

The above has described the basic operation of an information search according to the present embodiment. Meanwhile, in a case where a filter such as a Bloom filter used to perform a probabilistic search as to whether or not a certain bit string is included in a group of other bit strings is used as an encrypted bit string, it is sometimes erroneously determined that an encrypted keyword corresponding to a search keyword serving as a search target matches an encrypted index that does not match the encrypted keyword. In the present embodiment, the information processing terminal 10 is thus able to detect the erroneous determination. The following describes, as an example, a case where a detection operation for an encrypted index in which a predetermined number of 0-value bits selected on the basis of a dynamically generated random number are inverted into 1-value bits. FIG. 8 is a diagram for describing an operation of detecting an erroneous determination in the search process according to the present embodiment.

In the example illustrated FIG. 8, the information processing server 20 stores an encrypted index 114 and the encrypted index 107. The bit-matching determiner 25 determines that the encrypted index 107 includes the encrypted bit string 102. In addition, the information processing server 20 also stores an encrypted random number bit string 118 and an encrypted random number bit string 115. The encrypted random number bit string 118 corresponds to the encrypted index 107 and is obtained by encrypting a random number bit string 112. The encrypted random number bit string 115 corresponds to the encrypted index 114 and is obtained by encrypting a random number bit string 116.

The following describes a flow of an operation of determining whether or not a determination made by the bit-matching determiner 25 is an erroneous determination. First, the communication controller 21 of the information processing server 20 sends the encrypted index 107 having a value of "00101111" and the encrypted random number bit string 118 to the information processing terminal 10. Next, the decrypting unit 19 of the information processing terminal 10 decrypts the received encrypted random number bit string 118 to generate the random number bit string 112 having a value of "00000101". The decrypting unit 19 calculates logical AND of the random number bit string 112 and the encrypted bit string 102 serving as an encrypted keyword to generate a determination-result bit string 113 having a value of "00000000". Here, in a case where the encrypted index 107 matches the encrypted bit string 102 serving as an encrypted keyword, the determination-result bit string 113 is a bit string having only 0-value bits as illustrated in the example in FIG. 8.

In addition, similarly, the communication controller 21 of the information processing server 20 sends the encrypted index 114 having a value of "00101111" and the encrypted random number bit string 115 to the information processing terminal 10. The decrypting unit 19 of the information processing terminal 10 decrypts the received encrypted random number bit string 115 to generate the random number bit string 116 having a value of "00000010". The decrypting unit 19 calculates logical AND of the random number bit string 116 and the encrypted bit string 102 serving as an encrypted keyword to generate a determination-result bit string 117 having a value of "00000010". Here, in a case where the encrypted index 114 does not match the encrypted bit string 102 serving as an encrypted keyword, the determination-result bit string 117 is a bit string having a 1-value bit as illustrated in the example in FIG. 8.

In this way, the information processing terminal 10 is able to determine whether or not a determination made by the bit-matching determiner 25 is an erroneous determination. With this function, it is possible to increase the searching accuracy.

It is to be noted that the above has described the example in which a single encrypted keyword is searched for. Meanwhile, a search condition sent by the information processing terminal 10 to the information processing server 20 may include a plurality of encrypted keywords serving as a search target. In addition, the search condition may further include a logical condition. FIG. 9 is a diagram for describing a flow of an operation concerning an information search including a plurality of encrypted bit strings according to the present embodiment, a plurality of pieces of inverted-bit-number information regarding the number of inverted bits, and a logical condition. FIG. 9 illustrates a plurality of encrypted keywords and a logical condition.

With reference to FIG. 9, the communicating unit 17 of the information processing terminal 10 sends, to the information processing server 20, a first encrypted keyword 119 having a value of "00101010", a second encrypted keyword 121 having a value of "00101011", inverted-bit-number information 120 having a value of "2", inverted-bit-number information 122 having a value of "1", and a logical condition 203. Here, the logical condition is, for example, a logical OR condition or a logical AND condition. That is, the logical condition includes, for example, an AND condition and an OR condition. Here, by using a plurality of search keywords and a logical condition received by the communication controller 21, the bit-matching determiner 25 of the information processing server 20 is able to determine whether or not search results for the plurality of search keywords meet the logical condition. The bit calculator 24 calculates exclusive OR of the plurality of encrypted keywords and an encrypted index to acquire respective bit calculation results. In addition, the bit-matching determiner 25 determines whether or not the encrypted index includes each encrypted keyword on the basis of a magnitude relationship between the bit calculation result and the sum of the numbers of inverted bits of both the plurality of encrypted keywords and the encrypted index. The communication controller 21 further executes a determination as to the received logical condition.

The information processing server 20 sends, to the information processing terminal 10, a search result for the information described above and sent by the information processing terminal 10. In a case where the logical condition is a logical OR condition and the bit-matching determiner 25 determines that the encrypted index includes at least one encrypted keyword from among the plurality of encrypted keywords, search results corresponding to the plurality of encrypted keywords are sent. In the example in FIG. 9, in a case where the bit-matching determiner 25 determines that the encrypted index includes any of the first encrypted keyword 119 having a value of "00101010" and the second encrypted keyword 121 having a value of "00101011", a search result for the encrypted keyword determined to be included in the encrypted index is sent to the information processing terminal 10.

It is to be noted that the above has described the example in which the logical condition is a logical OR condition. However, the logical condition may be a logical AND condition. The information processing terminal 10 according to the present embodiment may further send a plurality of pieces of inverted-bit-number information regarding the number of bits inverted by the bit inverting unit 15, a logical AND condition, and a plurality of encrypted keywords. In a case where the bit-matching determiner described above determines that the encrypted index includes all of the plurality of encrypted keywords, the information processing server 20 according to the present embodiment may send search results corresponding to the plurality of encrypted keywords described above.

The function achieves both the convenience and the level of security and enables a flexible information search.

As described above, the information processing terminal 10 and the information processing server 20 according to the present embodiment make it possible to generate encrypted data and an encrypted index and to achieve a search by using an encrypted keyword. In addition, the information processing terminal 10 and the information processing server 20 are able to execute a process of updating or deleting encrypted data and an encrypted index.

The information processing terminal 10 acquires, from the information processing server 20, inverted-bit-number information and an encrypted index corresponding to encrypted data to be updated or to be deleted. Next, the information processing terminal 10 decrypts the received encrypted index to generate a search index, and determines whether or not the decrypted search index matches a search keyword. In a case where the decrypted search index is determined to match the search keyword, the information processing terminal 10 requests the information processing server 20 to execute an update process or delete process for plaintext data corresponding to the search index.

In this way, the functions of the information processing terminal 10 and the information processing server 20 make it possible to execute basic processes concerning computer software while ensuring both the searching performance and the level of security.

6. Flow of Operation

Next, description is made of a flow of an operation of registering an encrypted index by the information processing terminal 10 and the information processing server 20 according to the present embodiment. FIG. 10 is a diagram illustrating an example of a flow of an operation of registering an encrypted index according to the present embodiment in the information processing server 20.

With reference to FIG. 10, the input unit 11 of the information processing terminal 10 first accepts an input operation performed by a user to receive plaintext data (S1101). Next, the extractor 12 generates a search index on the basis of the plaintext data received in step S1101 (S1102). Then, the encrypting unit 13 maps a hash value into a predetermined bit string to generate an encrypted index (S1103). The hash value is calculated by using keyed hashing from the search index generated in step S1102.

Meanwhile, the random number generator 16 generates a random number. On the basis of the random number generated by the random number generator 16, the bit inverting unit 15 generates a random number bit string having the same length as that of an encrypted bit string (S1104). Next, the bit inverting unit 15 calculates exclusive OR of the encrypted bit string and the random number bit string generated in step S1104 (S1105). Then, the communicating unit 17 sends the encrypted data, the encrypted index, and inverted-bit-number information to the information processing server 20 (S1106).

The communication controller 21 of the information processing server 20 receives the encrypted data, the encrypted index, and the inverted-bit-number information sent in step S1106, and sends them to the storage unit 23. The storage unit 23 stores, into a storage region, the received encrypted data, encrypted index, and inverted-bit-number information (S1107).

Next, description is made of a flow of an operation of searching plaintext data including a predetermined search keyword. FIG. 11 is a diagram illustrating an example of a flow of an operation of searching an encrypted index including an encrypted keyword according to the present embodiment. With reference to FIG. 11, the input unit 11 of the information processing terminal 10 first accepts an input operation performed by a user to receive a search keyword (S1201). Then, the encrypting unit 13 maps a hash value into a predetermined bit string to generate an encrypted keyword (S1202). The hash value is calculated by using keyed hashing from the search keyword received in step S1201.

Meanwhile, the random number generator 16 generates a random number. On the basis of the random number generated by the random number generator 16, the bit inverting unit 15 generates a random number bit string having the same length as that of an encrypted bit string (S1203). Next, the bit inverting unit 15 selects a predetermined number of bits from the encrypted keyword on the basis of the random number bit string generated in step S1203 and inverts the predetermined number of selected bits (S1204). Then, the communicating unit 17 sends the encrypted bit string generated in step S1204 and inverted-bit-number information to the information processing server 20 (S1205).

The communication controller 21 of the information processing server 20 receives the encrypted keyword and the inverted-bit-number information sent in step S1205 (S1205). Next, the searching unit 22 retrieves an encrypted index stored in the storage unit 23 to send it to the bit calculator 24 (S1206). Then, the bit calculator 24 calculates exclusive OR of the encrypted keyword retrieved in step S1206 and the encrypted index received in step S1205 (S1207). Next, the bit-matching determiner 25 performs bit count on a bit calculation result calculated in step S1206 to generate a bit count result (S1208). It is then determined whether or not an encrypted index includes an encrypted keyword on the basis of a comparison as to a magnitude relationship between the bit count result generated in step S1208 and the sum of the inverted-bit number of the encrypted keyword and the inverted-bit number of the encrypted index (S1209). In a case where the bit-matching determiner 25 determines that the encrypted index includes the encrypted keyword, the communication controller 21 sends a search result corresponding to the encrypted keyword to the information processing terminal 10 (S1210).

7. Hardware Configuration Example

Next, a hardware configuration example of each of the information processing terminal 10 and the information processing server 20 according to the embodiment of the present disclosure is described. FIG. 12 is a block diagram illustrating a hardware configuration example of each of the information processing terminal 10 and the information processing server 20 according to the embodiment of the present disclosure. Referring to FIG. 12, the information processing terminal 10 and the information processing server 20 each include, for example, a processor 871, ROM 872, RAM 873, a host bus 874, a bridge 875, an external bus 876, an interface 877, an input device 878, an output device 879, a storage 880, a drive 881, a coupling port 882, and a communication device 883. It is to be noted that the hardware configuration illustrated here is an example, and a portion of the components may be omitted. In addition, a component other than the components illustrated here may be further included.

(Processor 871)

The processor 871 functions, for example, as an arithmetic processing device or a control device, and controls the overall operation of each component or a portion thereof on the basis of a variety of programs recorded in the ROM 872, the RAM 873, the storage 880, or a removable recording medium 901.

(ROM 872 and RAM 873)

The ROM 872 is means for storing a program to be read by the processor 871, data to be used for calculation, or the like. The RAM 873 temporarily or permanently stores, for example, a program to be read by the processor 871, a variety of parameters appropriately changing in executing the program, or the like.

(Host Bus 874, Bridge 875, External Bus 876, and Interface 877)

The processor 871, the ROM 872, and the RAM 873 are coupled to each other, for example, through the host bus 874 that is able to transmit data at high speed. Meanwhile, the host bus 874 is coupled to the external bus 876 having a relatively low data transmission rate, for example, through the bridge 875. In addition, the external bus 876 is coupled to a variety of components through the interface 877.

(Input Device 878)

For example, a mouse, a keyboard, a touch panel, a button, a switch, a lever, and the like are used for the input device 878. Further, as the input device 878, a remote controller (referred to as a remote control below) is sometimes used that is able to transmit a control signal by using infrared rays or other radio waves. In addition, the input device 878 includes an audio input device such as a microphone.

(Output Device 879)

The output device 879 is a device that is able to visually or aurally notify a user of acquired information. Examples of the device include a display device such as CRT (Cathode Ray Tube), LCD, or organic EL, an audio output device such as a speaker or a headphone, a printer, a mobile phone, a facsimile, or the like. In addition, the output device 879 according to the present disclosure includes a variety of vibration devices that are able to output tactile stimulation.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads out information recorded in the removable recording medium 901 such as a magnetic disk, an optical disc, a magneto-optical disk, or a semiconductor memory or writes information to the removable recording medium 901.

(Removable Recording Medium 901)

The removable recording medium 901 is, for example, a DVD medium, a Blu-ray (registered trademark) medium, an HD DVD medium, a variety of semiconductor storage media, or the like. Needless to say, the removable recording medium 901 may be, for example, an IC card, an electronic apparatus, or the like each of which is mounted with a contactless IC chip.

(Coupling Port 882)

The coupling port 882 is, for example, a port such as a USB (Universal Serial Bus) port, an IEEE 1394 port, SCSI (Small Computer System Interface), an RS-232C port, or an optical audio terminal for coupling an external coupling apparatus 902.

(External Coupling Apparatus 902)

The external coupling apparatus 902 is, for example, a printer, a portable music player, a digital camera, a digital video camera, an IC recorder, or the like.

(Communication Device 883)

The communication device 883 is a communication device for coupling to a network. The communication device 883 is, for example, a communication card for wired or wireless LAN, Bluetooth (registered trademark), or WUSB (Wireless USB), a router for optical communication, a router for ADSL (Asymmetric Digital Subscriber Line), a modem for various kinds of communication, or the like.

8. Conclusion

As described above, the information processing terminal 10 and the information processing server 20 according to the embodiment of the present disclosure are able to invert a predetermined bit selected from an encrypted keyword and an encrypted index on the basis of a random number to perform an information search. The function makes it possible to execute an information search through communication that ensures both the searching performance and the level of security.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

In addition, the effects described herein are merely illustrative and exemplary, but not limitative. That is, the technology according to the present disclosure may exert other effects that are apparent to those skilled in the art from the description herein in addition to the above-described effects or in place of the above-described effects.

In addition, the respective steps for the processes of each of the information processing terminal 10 and the information processing server 20 in this specification do not necessarily have to be performed in chronological order in accordance with the order illustrated in the sequence diagrams. For example, the respective steps for the processes of each of the information processing terminal 10 and the information processing server 20 may be performed in order different from the order illustrated in the flowcharts, or may also be performed in parallel.

It is to be noted that the following configurations also fall within the technical scope of the present disclosure.

(1)

An information processing apparatus including:

an encrypting unit that generates an encrypted bit string in which a hash value calculated by using keyed hashing from a keyword for an information search is mapped into a bit string having a predetermined length;

a bit inverting unit that selects a predetermined number of bits from the encrypted bit string on the basis of a dynamically generated random number, and inverts the predetermined number of selected bits; and a communicating unit that sends the encrypted bit string and inverted-bit-number information to an external apparatus, the inverted-bit-number information indicating a number of bits inverted by the bit inverting unit.

(2)

The information processing apparatus according to (1), in which the keyword for the information search includes a search keyword, the encrypting unit generates an encrypted keyword in which a hash value calculated by using the search keyword and keyed hashing is mapped into a bit string having a predetermined length, the bit inverting unit selects a predetermined number of bits from the encrypted keyword on the basis of the dynamically generated random number, and inverts the predetermined number of selected bits, the communicating unit sends the encrypted keyword and inverted-bit-number information regarding the encrypted keyword to the external apparatus, and receives an encryption search result corresponding to the encrypted keyword, and the encryption search result includes a result of an information search executed by using a technology for searchable encryption.

(3)

The information processing apparatus according to (1) or (2), in which the encrypted bit string includes a Bloom filter.

(4)

The information processing apparatus according to any of (1) to (3), in which the encrypting unit generates a grouped encrypted bit string serving as a result of calculation of logical OR of a plurality of the encrypted bit strings, the bit inverting unit selects a predetermined number of bits from the grouped encrypted bit string on the basis of the dynamically generated random number, and inverts the predetermined number of selected bits, and the communicating unit sends the inverted-bit-number information regarding the number of inverted bits and the grouped encrypted bit string.

(5)

The information processing apparatus according to any of (1) to (4), in which the communicating unit further sends a plurality of pieces of the inverted-bit-number information regarding the number of bits inverted by the bit inverting unit, a logical condition, and a plurality of the encrypted bit strings.

(6)

The information processing apparatus according to (5), in which the logical condition includes a logical OR condition or a logical AND condition, and an encryption search result for the sent encrypted bit string includes an encryption search result based on the logical OR condition or the logical AND condition of the at least two or more encrypted bit strings.

(7)

The information processing apparatus according to any of (1) to (6), in which the bit inverting unit selects a predetermined number of 0-value bits from the encrypted bit string on the basis of the dynamically generated random number, and inverts the predetermined number of selected 0-value bits into 1-value bits.

(8)

The information processing apparatus according to (1) or any of (3) to (7), in which the keyword for the information search includes a search index, the encrypting unit generates an encrypted index in which a hash value calculated by using the search index and keyed hashing is mapped into a bit string having a predetermined length, and the bit inverting unit selects a predetermined number of bits from the encrypted index on the basis of the dynamically generated random number, and inverts the predetermined number of selected bits.

(9)

The information processing apparatus according to (8), in which the communicating unit further receives, as a search result, the encrypted inverted-bit-number information corresponding to the encrypted index in which the predetermined number of bits are inverted, the encrypted index corresponding to a sent encrypted keyword, the information processing apparatus further includes a decrypting unit that generates the inverted-bit-number information before encryption on the basis of the encrypted inverted-bit-number information, and the decrypting unit calculates logical AND of the encrypted keyword and the inverted-bit-number information before the encryption to determine whether or not the search result includes an erroneous determination on the basis of a result of the calculation.

(10)

The information processing apparatus according to any of (1) to (9), in which the encrypting unit generates the encrypted bit string by using HMAC algorithm.

(11)

An information processing apparatus including:

a communication controller that receives an encrypted keyword and inverted-bit-number information from a client terminal, the inverted-bit-number information indicating an inverted-bit number of the encrypted keyword;

a bit calculator that acquires a bit calculation result and a bit count result for the bit calculation result, the bit calculation result being obtained by calculating exclusive OR of the encrypted keyword and an encrypted index to be stored; and a bit-matching determiner that determines whether or not the encrypted index includes the encrypted keyword on the basis of a comparison as to a magnitude relationship between the bit count result and a sum of the inverted-bit number of the encrypted keyword and an inverted-bit number of the encrypted index, in which the encrypted keyword and the encrypted index each include an encrypted bit string in which a predetermined number of bits are inverted on the basis of a dynamically generated random number after a hash value calculated by using keyed hashing is mapped into a bit string having a predetermined length, and in a case where the bit-matching determiner determines that the encrypted index includes the encrypted keyword, the communication controller sends a search result corresponding to the encrypted keyword to the client terminal.

(12)

The information processing apparatus according to (11), in which the search result includes encrypted data or a list for the encrypted data.

(13)

The information processing apparatus according to (11) or (12), in which, in a case where the bit count result is less than or equal to a sum of numbers of inverted bits of both the encrypted keyword and the encrypted index, the bit-matching determiner determines that the encrypted index includes the encrypted keyword.

(14)

The information processing apparatus according to (11), in which the communication controller receives a plurality of the encrypted keywords, a plurality of pieces of the inverted-bit-number information regarding a plurality of the encrypted keywords, and a logical condition, for each of a plurality of the encrypted keywords, the bit calculator calculates exclusive OR of the encrypted keyword and the encrypted index to acquire the bit calculation result and the bit count result, the bit-matching determiner determines whether or not the search index includes each of the plurality of search keywords on the basis of a magnitude relationship between the bit calculation result and a sum of numbers of inverted bits of both the encrypted keyword and the encrypted index, and in a case where a determination corresponding to the plurality of encrypted keywords meets a logical condition, the communication controller sends a search result.

(15)

The information processing apparatus according to (14), in which the logical condition includes a logical OR condition, and in a case where the bit-matching determiner determines, on the basis of the logical OR condition, that the encrypted index includes at least one of the plurality of encrypted keywords, the communication controller sends a search result corresponding to the plurality of encrypted keywords.

(16)

The information processing apparatus according to (14), in which the logical condition includes a logical AND condition, and in a case where the bit-matching determiner determines, on the basis of the logical AND condition, that the encrypted index includes all of the plurality of encrypted keywords, the communication controller sends a search result corresponding to the plurality of encrypted keywords.

(17)

An information processing method including, by a processor:

generating an encrypted bit string in which a hash value calculated by using keyed hashing from a keyword for an information search is mapped into a bit string having a predetermined length;

selecting a predetermined number of bits from the encrypted bit string on the basis of a dynamically generated random number, and inverting the predetermined number of selected bits; and sending inverted-bit-number information regarding a number of inverted bits and the encrypted bit string to an external apparatus.

(18)

An information processing method including, by a processor:

receiving an encrypted keyword and inverted-bit-number information from a client terminal, the inverted-bit-number information indicating an inverted-bit number of the encrypted keyword;

acquiring a bit calculation result and a bit count result for the bit calculation result, the bit calculation result being obtained by calculating exclusive OR of the encrypted keyword and an encrypted index to be stored; and determining whether or not the encrypted index includes the encrypted keyword on the basis of a comparison as to a magnitude relationship between the bit count result and a sum of the inverted-bit number of the encrypted keyword and an inverted-bit number of the encrypted index, in which the encrypted keyword and the encrypted index each include an encrypted bit string in which a predetermined number of bits are inverted on the basis of a dynamically generated random number after a hash value calculated by using keyed hashing is mapped into a bit string having a predetermined length, and in a case where the encrypted index is determined to include the encrypted keyword, a search result corresponding to the encrypted keyword is sent to the client terminal.

REFERENCE SIGNS LIST 10 information processing terminal
11 input unit
12 extractor
13 encrypting unit
14 key manager
15 bit inverting unit
16 random number generator
17 communicating unit
18 output unit
19 decrypting unit
20 information processing server
21 communication controller
22 searching unit
23 storage unit
24 bit calculator
25 bit-matching determiner
30 network

The invention claimed is:

1. An information processing apparatus, comprising:

an encrypting unit configured to generate an encrypted bit string in which a hash value calculated by using keyed hashing from a keyword for an information search is mapped into a bit string having a predetermined length;

a bit inverting unit configured to select a predetermined number of bits from the encrypted bit string on a basis of a dynamically generated random number, and invert the predetermined number of selected bits;

a communicating unit configured to receive, as a search result, encrypted inverted-bit-number information corresponding to an encrypted index in which the predetermined number of bits are inverted, the encrypted index corresponding to a sent encrypted keyword; and a decrypting unit configured to generate inverted-bit-number information before encryption on a basis of the encrypted inverted-bit-number information, wherein the communication is further configured to send the encrypted bit string and the inverted-bit-number information to an external apparatus, the inverted-bit-number information indicating a number of bits inverted by the bit inverting unit, and the decrypting unit is further configured to calculate logical AND of the encrypted keyword and the inverted-bit-number information before the encryption to determine whether or not the search result includes an erroneous determination on a basis of a result of the calculation.

2. The information processing apparatus according to claim 1, wherein the keyword for the information search includes a search keyword, the encrypting unit is further configured to generate the encrypted keyword in which a hash value calculated by using the search keyword and keyed hashing is mapped into the bit string having the predetermined length, the bit inverting unit is further configured to select a predetermined number of bits from the encrypted keyword on the basis of the dynamically generated random number, and invert the predetermined number of selected bits, the communicating unit is further configured to send the encrypted keyword and inverted-bit-number information regarding the encrypted keyword to the external apparatus, and receive an encryption search result corresponding to the encrypted keyword, and the encryption search result includes a result of an information search using searchable encryption.

3. The information processing apparatus according to claim 2, wherein the communicating unit is further configured to send the plurality of encrypted bit strings, a plurality of pieces of the inverted-bit-number information regarding the number of bits inverted by the bit inverting unit, and a logical condition.

4. The information processing apparatus according to claim 3, wherein the logical condition includes a logical OR condition or a logical AND condition, and an encryption search result for the sent encrypted bit string includes an encryption search result based on the logical OR condition or the logical AND condition of the at least two or more encrypted bit strings.

5. The information processing apparatus according to claim 1, wherein the encrypted bit string includes a Bloom filter.

6. The information processing apparatus according to claim 1, wherein the encrypting unit is further configured to generate a grouped encrypted bit string serving as a result of calculation of logical OR of a plurality of encrypted bit strings, the bit inverting unit is further configured to select a predetermined number of bits from the grouped encrypted bit string on the basis of the dynamically generated random number, and invert the predetermined number of selected bits, and the communicating unit is further configured to send the inverted-bit-number information regarding the number of inverted bits and the grouped encrypted bit string.

7. The information processing apparatus according to claim 1, wherein the bit inverting unit is further configured to select a predetermined number of 0-value bits from the encrypted bit string on the basis of the dynamically generated random number, and invert the predetermined number of selected 0-value bits into 1-value bits.

8. The information processing apparatus according to claim 1, wherein the keyword for the information search includes a search index, the encrypting unit is further configured to generate the encrypted index in which a hash value calculated by using the search index and keyed hashing is mapped into the bit string having the predetermined length, and the bit inverting unit is further configured to select the predetermined number of bits from the encrypted index on the basis of the dynamically generated random number, and invert the predetermined number of selected bits.

9. The information processing apparatus according to claim 1, wherein the encrypting unit is further configured to generate the encrypted bit string by using HMAC algorithm.

10. An information processing method comprising, by a processor:

generating an encrypted bit string in which a hash value calculated by using keyed hashing from a keyword for an information search is mapped into a bit string having a predetermined length;

selecting a predetermined number of bits from the encrypted bit string on a basis of a dynamically generated random number, and inverting the predetermined number of selected bits;

receiving, as a search result, encrypted inverted-bit-number information corresponding to an encrypted index in which the predetermined number of bits are inverted, the encrypted index corresponding to a sent encrypted keyword;

generating inverted-bit-number information before encryption on a basis of the encrypted inverted-bit-number information;

sending the inverted-bit-number information regarding a number of inverted bits and the encrypted bit string to an external apparatus; and calculating logical AND of the encrypted keyword and the inverted-bit-number information before the encryption to determine whether or not the search result includes an erroneous determination on a basis of a result of the calculation.

\* \* \* \* \*